J. H. STONE.
COTTON CHOPPER.
APPLICATION FILED MAR. 25, 1913.
1,093,894.
Patented Apr. 21, 1914.
2 SHEETS—SHEET 1.
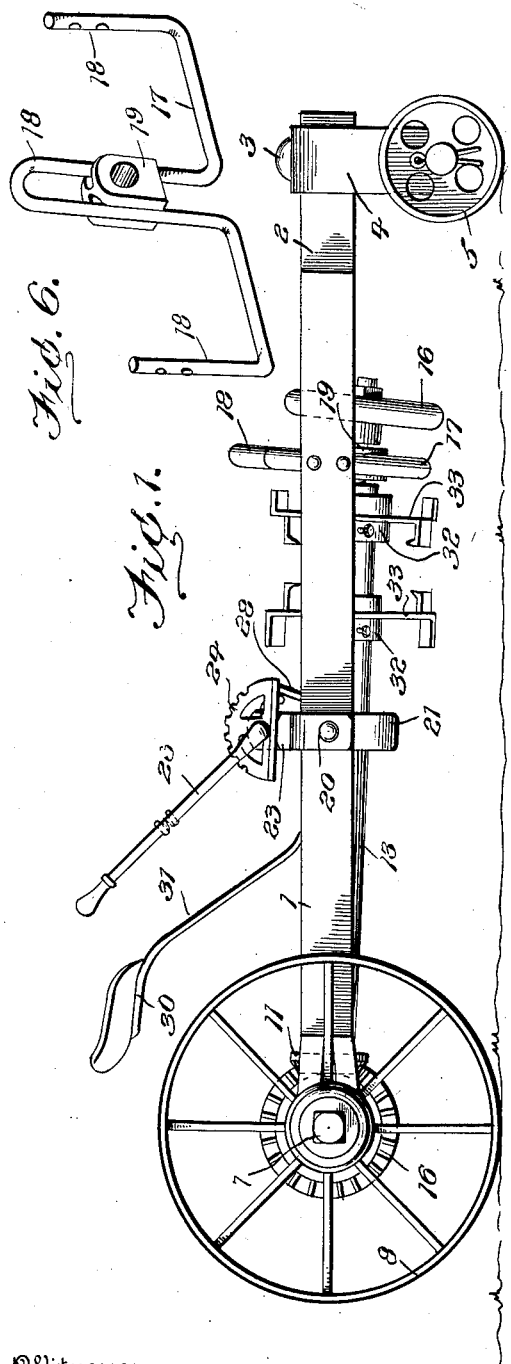
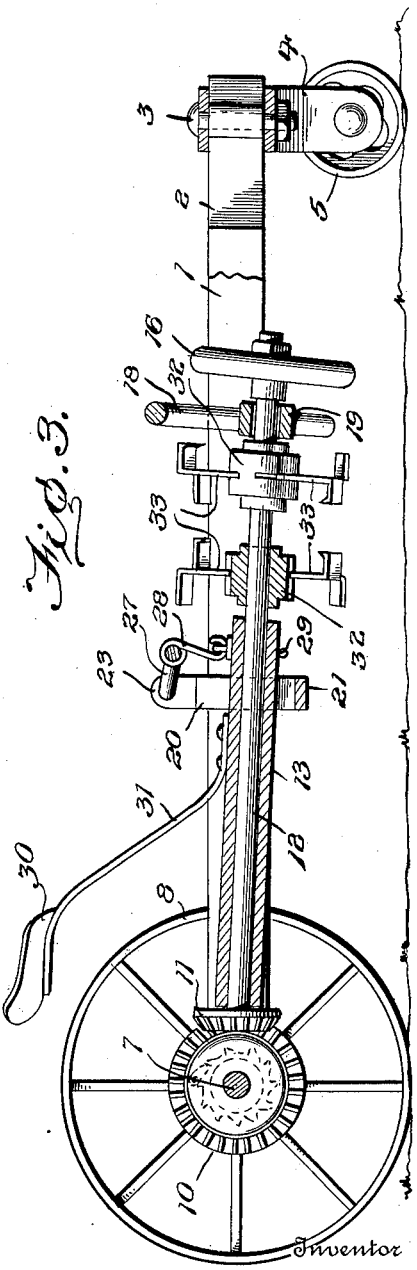
Inventor
J. H. Stone.

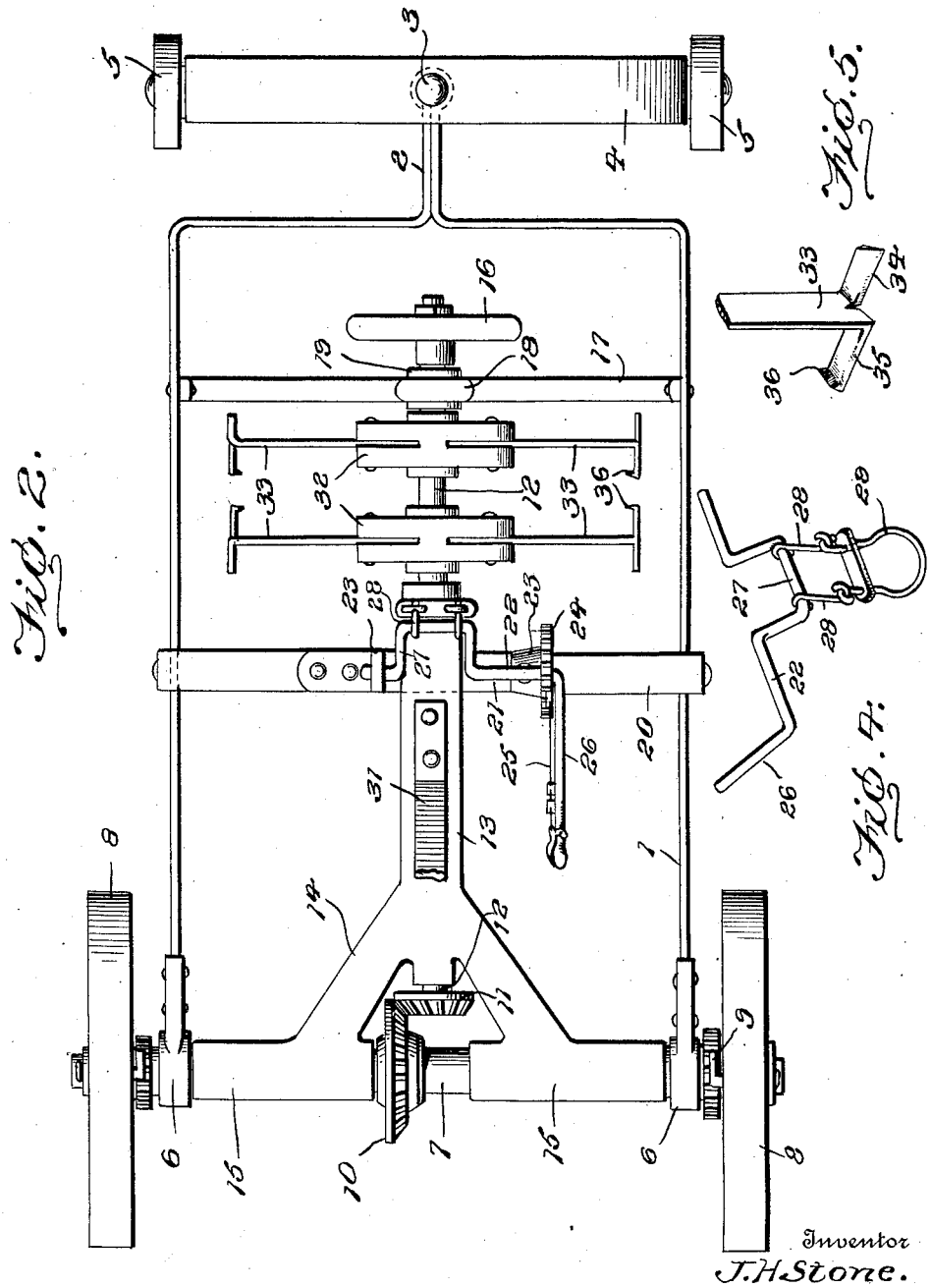

UNITED STATES PATENT OFFICE.

JOSEPH H. STONE, OF OKEMAH, OKLAHOMA.

COTTON-CHOPPER.

1,093,894. Specification of Letters Patent. Patented Apr. 21, 1914.

Application filed March 25, 1913. Serial No. 756,809.

*To all whom it may concern:*

Be it known that I, JOSEPH HENRY STONE, citizen of the United States, residing at Okemah, in the county of Okfuskee and State of Oklahoma, have invented certain new and useful Improvements in Cotton-Choppers, of which the following is a specification.

This invention relates to cotton choppers and has as its object the provision of a simple and easily operated machine by which cotton or other plants may be effectually thinned out so that the plants left growing may fully develop.

The invention seeks to simplify the arrangement of parts of this class of machines to the end that the durability of the machine will be increased and the liability of the parts to get out of order will be reduced.

The invention is fully illustrated in the accompanying drawings and consists in certain novel features of construction which will be hereinafter first fully described and then specifically pointed out in the appended claims.

In the drawings: Figure 1 is a side elevation of a cotton chopper constructed in accordance with my invention; Fig. 2 is a plan view of the same; Fig. 3 is a longitudinal section; Fig. 4 is a detail perspective view of the means for raising and lowering the chopper shaft; Fig. 5 is a detail perspective view of the chopper blades; Fig. 6 is a detail perspective view of the guide for the front end of the chopper shaft.

Corresponding and like parts are referred to in the following description and indicated in the accompanying drawings by the same reference characters.

In carrying out my invention I employ a main frame 1 which is preferably U-shaped as clearly shown in Fig. 2 and has a central forward extension 2 which is adapted to receive the king-bolt 3 upon which the yoke or steering frame 4 is mounted, said yoke or steering frame being equipped with ground wheels 5 at its ends as clearly shown. To the rear ends of the side bars of the main frame I rigidly secure bearings 6 in which the axle 7 of the rear ground wheels 8 is journaled. The wheels 8 are loosely mounted upon the axle and are connected thereto by escapement devices 9 indicated conventionally in the drawings, whereby as the machine is drawn forward the axle will be rotated and the chopper shaft operated, but, when the machine is moved backward the axle will remain stationary and the chopper shaft will not operate. The axle 7 has rigidly mounted thereon at about its center a gear wheel 10 which meshes with a pinion 11 on the rear end of the chopper shaft 12, said chopper shaft being journaled in a sleeve 13 projecting from a yoke or supplemental frame 14 which is provided at its rear end with tubes or bearing sleeves 15 fitted loosely upon the axle 7 between the bearings 6 as shown, the said bearings receiving the lateral thrust of the ends of the sleeves 15 whereby the said sleeves will be prevented from sliding upon the axle transversely of the machine. The chopper shaft 12 projects forward beyond the elongated bearing 13 and is equipped at its front extremity with a fly-wheel 16, whereby the movement of the chopper shaft will be balanced so that an even steady operation of the chopper knives will be attained.

A cross bar 17 is secured to the main frame near the front end thereof and said cross bar has a central slotted or arched portion 18 which forms a guide for a bearing 19 of the shaft, said bearing 19 being provided with grooves in its side which engage the sides of the slotted or arched portion 18 of the cross bar so that vertical movement of the chopper shaft will be permitted but transverse movement thereof will be prevented. A second cross bar 20 is secured to the main frame just in rear of the front end of the sleeve 13 and this cross bar is constructed with a central depressed portion 21 which passes under the sleeve 13 and the chopper shaft so that downward movement of the said sleeve will be limited and the knives will be prevented from digging into the ground to such a depth as would cause a drag of the machine and prevent its successful operation.

A rock shaft 22 is journaled in suitable bearings 23 upon the cross bar 20 and upon one of the said bearings 23 is formed a segment or rack 24 which is adapted to be engaged by a latch 25 carried by the operating lever 26 which is rigid with one end of the rock shaft. The intermediate portion of the rock shaft is constructed with a crank 27 upon which are hung links 28 having a yoke or stirrup 29 suspended from their lower ends, said stirrup or yoke passing around and below the front end of the sleeve 13 so that if the crank 27 be swung up or down the sleeve and the chopper shaft will be correspondingly raised and lowered.

A driver's seat 30 is carried by a suitable spring standard 31 mounted upon the sleeve 13 as clearly shown.

Upon the front portion of the chopper shaft I secure in any convenient or preferred manner, radial arms 32 in which are rigidly secured the shanks 33 of the chopper blades. The shanks 33 extend radially from the arms 32 and have their outer ends bifurcated and the branches of the bifurcation bent in opposite directions as indicated at 34 and 35. The advance edges of these members 34—35, relative to the direction of rotation of the chopper shaft, are beveled and sharpened so that they will pass through the ground and cut through the roots of the plants so that as the machine progresses over the field some of the plants will be cut out at regular intervals.

It will be observed that the cutters are arranged in pairs and the shanks of the cutters are intended to pass at opposite sides of the plants which are to be retained. The branches 35 of the cutters which extend toward each other are provided at their opposed ends with lips or teeth 36 adapted to cut through straggling vines and the stems projecting from the plants to be left so that the plants will be properly pruned and their development assured.

The arms or hubs 32 of the chopper knives are secured to the chopper shaft in any desired or convenient manner and are intended to be adjusted axially of the shaft between the bearing 19 and the end of the sleeve 13 so that the distance between the plants left standing may be regulated.

It is thought the operation of my improved chopper will be readily understood. The draft animals are attached in any convenient manner to the front frame or yoke 4 and the machine is then drawn over the field along the rows of plants. As the machine is drawn forward the axle 7 will be rotated in the manner previously stated and the gear wheel 10 will consequently be rotated and impart motion to the pinion 11 and the chopper shaft. The chopper blades being rigid with said shaft will, of course, be rotated with it and consequently will cut through and chop out the plants rapidly, cleanly and effectually. The fly wheel 16 at the front end of the chopper shaft avoids all unevenness in the operation of the said shaft and by manipulating the lever 26, as will be readily understood, the chopper shaft may be lowered to the proper degree to permit the plants to be cut at the desired depth or the shaft may be raised so that the blades will be kept entirely clear of the ground.

It will be readily noted that the frame carrying the chopper shaft is supported upon the rear axle and is mounted so as to swing about the said axle as a center. Consequently, the raising and lowering of the chopper shaft will not affect the operation thereof and consequently the shaft may be raised or lowered as the machine is drawn over the field so as to compensate for the unevenness in the surface of the ground and the liability of the blades to occasionally miss a stroke will be thereby overcome.

My improved chopper is exceedingly simple in its construction and the arrangement of parts is such that they will not get out of order and will be found highly efficient for the purpose for which it is designed.

Having thus described my invention what I claim as new is:

1. A cotton chopper comprising a main frame, a driving shaft mounted transversely thereon, a chopper shaft disposed longitudinally of the main frame, gearing connecting said shafts, an elongated bearing for the chopper shaft having divergent branches at its rear and terminating in sleeves encircling the driving shaft, a cross bar on the main frame having a depressed portion extending under the chopper shaft, a second cross bar secured upon the main frame having an arched portion extending over the chopper shaft, a support for the front end of the chopper shaft movable vertically in the arched portion of said second cross bar, and chopper blades secured upon the chopper shaft between the cross bars.

2. A cotton chopper comprising a main frame, a cross bar secured thereto and having a depressed central portion, a chopper shaft disposed longitudinally of the main frame and extending over the said depressed portion of the said cross bar, means for rotating said shaft, chopper blades carried by said shaft, a rock shaft mounted upon said cross bar and provided with a crank portion, links pivotally hung upon said crank portion of said rock shaft, and a stirrup suspended from said links and supporting the chopper shaft.

In testimony whereof I affix my signature in presence of two witnesses.

JOSEPH H. STONE. [L. S.]

Witnesses:
O. P. BEARDEN,
WM. JONES COOK.

---

Copies of this patent may be obtained for five cents each, by addressing the "Commissioner of Patents, Washington, D. C."